Figure 1:
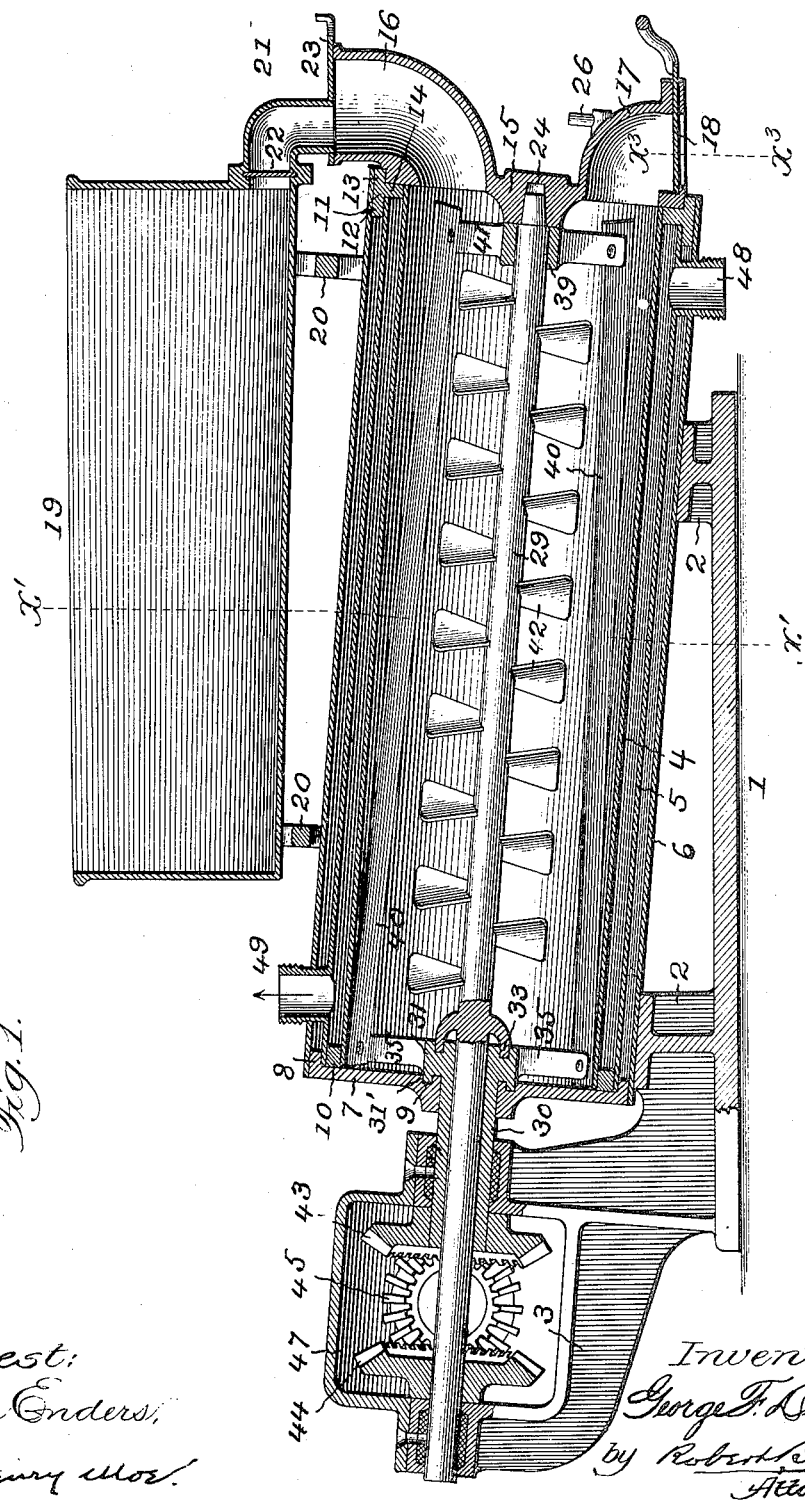

G. F. DICKSON.
ICE CREAM FREEZER.
APPLICATION FILED AUG. 5, 1907.

952,031.

Patented Mar. 15, 1910.

3 SHEETS—SHEET 1.

Attest:
John Enders,
Henry Moe.

Inventor:
George F. Dickson,
by Robert Burns
Attorney

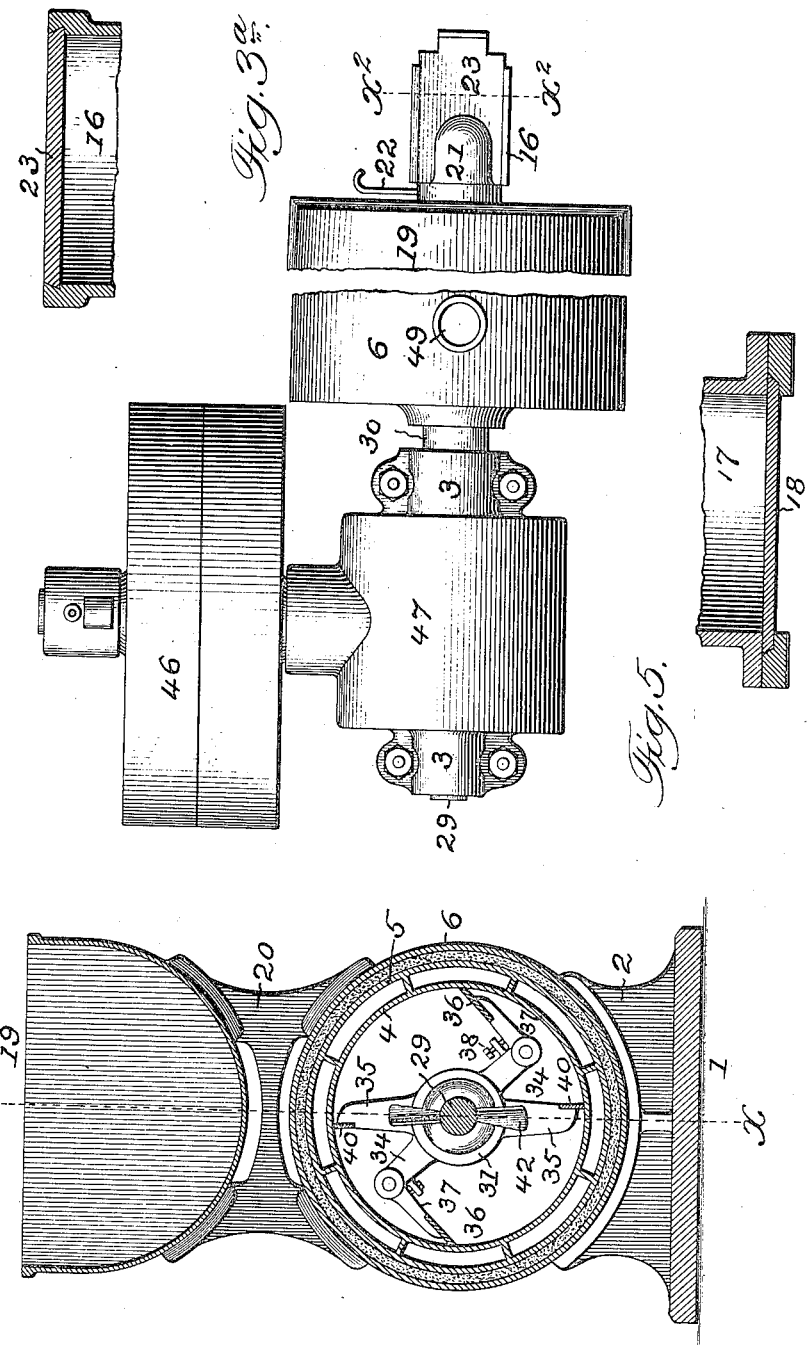

G. F. DICKSON.
ICE CREAM FREEZER.
APPLICATION FILED AUG. 5, 1907.
952,031.
Patented Mar. 15, 1910.
3 SHEETS—SHEET 3.
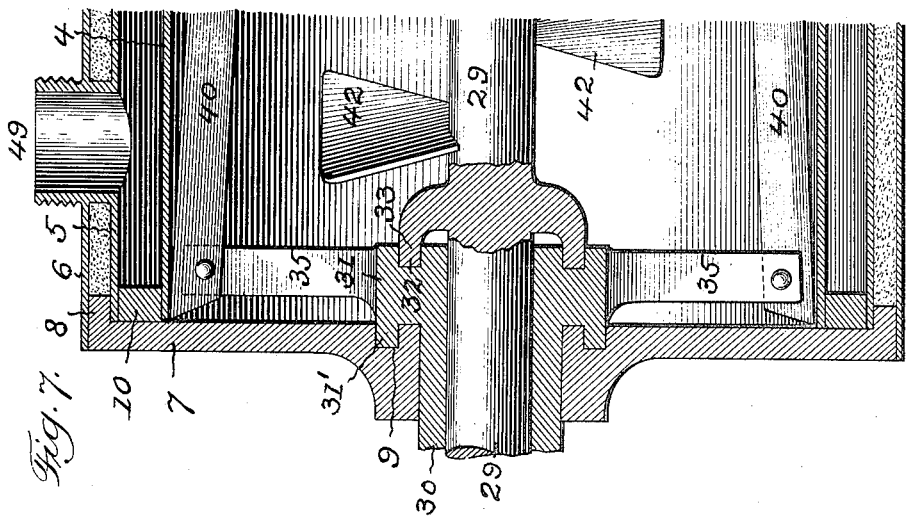
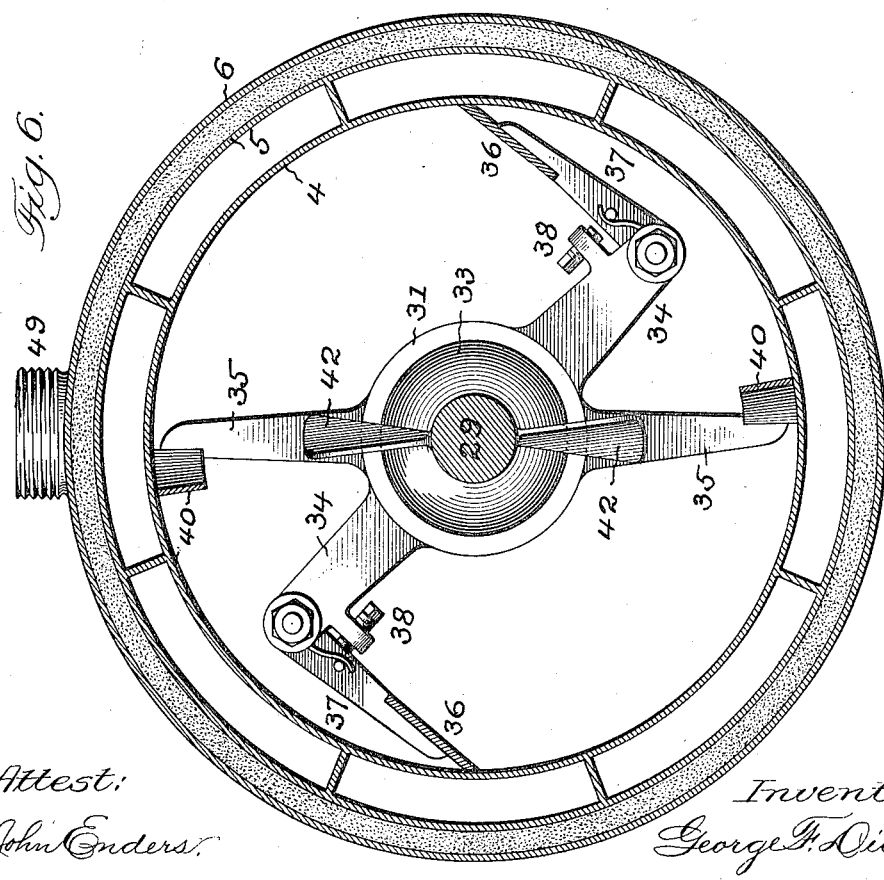
Attest:
John Enders
Henry Moe
Inventor:
George F. Dickson,
by Robert Burns
Attorney

UNITED STATES PATENT OFFICE.

GEORGE F. DICKSON, OF CHICAGO, ILLINOIS, ASSIGNOR TO CONFECTIONERS AND BAKERS SUPPLY CO., OF CHICAGO, ILLINOIS, A CORPORATION OF ILLINOIS.

ICE-CREAM FREEZER.

952,031.  Specification of Letters Patent.  Patented Mar. 15, 1910.

Application filed August 5, 1907. Serial No. 387,046.

*To all whom it may concern:*

Be it known that I, GEORGE F. DICKSON, a citizen of the United States of America, and a resident of Chicago, in the county of Cook and State of Illinois, have invented certain new and useful Improvements in Ice-Cream Freezers, of which the following is a specification.

This invention relates to that class of ice-cream freezers in which the freezing operation is conducted in a horizontally arranged chamber surrounded by an annular refrigerating brine chamber and provided with power driven conveyers and scrapers to keep the cream in constant agitation during the progress of the operation. And the present improvement has for its various objects to provide a simple and efficient arrangement or inclination of the freezing chamber whereby the operation of producing a high grade product in a rapid and certain manner is attained, and the ready discharge of such product effected upon the completion of the freezing operation; to provide a simple and efficient structural formation and combination of parts whereby leakage along the driving shafts of the conveyers and scrapers is prevented; and to provide a simple and effective scraping and conveying mechanism for imparting an endless circulation to the material, during the freezing operation, with a resulting uniform and even condition of the finished product, all as will hereinafter more fully appear.

In the accompanying drawings:—Figure 1, is a central longitudinal section on line $x$—$x$, Fig. 2 of an ice cream freezer embodying the present invention. Fig. 2, is a transverse section, on line $x'$—$x'$ Fig. 1. Fig. 3, is a detail plan of the rear portion of the apparatus. Fig. 3ª is a similar view of the front portion of the apparatus. Fig. 4, is a detail section, on line $x^2$—$x^2$ Fig. 3ª. Fig. 5, is a similar view, on line $x^3$—$x^3$ Fig. 1. Fig. 6, is an enlarged detail transverse section on line $x'$—$x'$ Fig. 1, of the freezing chamber and its accessories. Fig. 7 is an enlarged detail longitudinal section on line $x$—$x$, Fig. 2.

Similar numerals of reference indicate like parts in the several views.

Referring to the drawings, 1 represents the supporting base or bed plate of the apparatus, provided with a pair of vertical saddle extensions 2, of different heights, and adapted to support the freezing chamber and its accessories inclined from the horizon for the purposes hereinafter stated. Such base is also provided at its rear end with a vertical and forked standard or pedestal 3, affording journal bearings for the carrying shafts of the hereinafter described scrapers and conveyers by which the material is mixed and moved in the interior of the freezing chamber.

4 is an inner cylindrical shell forming the circular inclosing wall of the freezing chamber.

5, is a secondary shell surrounding the inner shell 4 and having spaced relation therewith to provide an annular chamber in which chilled brine is adapted to circulate in the operation of the apparatus.

6 is an outer shell surrounding the shell 5, and having spaced relation thereto to provide an annular chamber for the reception of a filling of suitable non-conducting material.

7 is the rear end head forming the closure for the rear end of the freezing chamber and formed with an annular flange 8 at its periphery, which fits between the aforesaid shells 5 and 6 to impose the required spaced relation thereon. Such head is also formed with an axial bore for the passage of the carrying shafts of the scraper and conveyer mechanism of the freezing chamber, and with a circular groove 9 on its inner face, concentric with said axial bore, to constitute a part of the packing gland hereinafter described.

10 is an annular ring arranged between the rear ends of the inner shell 4 and secondary shell 5 to impose the required spaced relation thereon.

11, is an annular ring having a T shape in cross section and arranged at the forward end of the freezing chamber with its annular flange 12 fitting between the aforesaid shells 5 and 6 to impose the required spaced relation thereon, while its other annular flange 13 forms a receiving recess for the hereinafter described removable head closing the forward end of the freezing chamber. The annular web portion 14 of such ring fits the exterior of the front end of the shell 4 to form the front end wall of the brine chamber above described.

The connections between the shells 4, 5, 6; the end head 7, and the annular rings 10 and 11, are made tight and leakage proof by brazing or other usual and suitable means.

15 is the removable front head of the freezing chamber, formed with a circular periphery to fit the before described receiving recess in the fixed annular ring 11, and to such end is made of a slightly larger diameter than the bore of the freezing chamber.

16, is an upwardly extending hopper or neck formed on the upper part of the head 15 and adapted to receive the cream to be frozen and conduct the same into the freezing chamber.

17 is a downwardly extending outlet neck formed on the lower part of the head 15, and adapted to permit the discharge of the frozen cream, when the gate 18 is open. Such gate 18 is preferably of the sliding type moving in suitable ways in the outlet neck as shown.

19 is a stationary open top receptacle supported above the freezing chamber, by intermediate brackets 20, and adapted to receive the supply of cream or the like, to be frozen.

21 is a faucet arranged at the forward end of the receptacle 19, and provided with a downturned nozzle which extends into the inlet hopper or neck 16 aforesaid, and with a sliding cut off valve or gate 22, as shown.

23 is a sliding cover moving in side guides at the top of the inlet hopper 16, and adapted when in place to prevent the entrance of dust and the like into the freezing chamber, and when removed to permit visual inspection of the material undergoing the freezing operation.

24, is a bearing recess formed axially in the head 15 and adapted to afford bearing for the forward end of the carrying shaft of the conveyer blades hereinafter described.

26 is one of a series of hand nuts adapted to fasten the removable front head 15 of the freezing chamber in place.

29 is an inner axially arranged conveyer shaft extending longitudinally through the freezing chamber, with its forward end journaled in the before described bearing recess 24 of the removable head 15; while at its rear end said shaft extends out beyond the freezing chamber and has bearing in a journal box carried by one fork of the pedestal 3, as shown.

30 is a tubular shaft surrounding the aforesaid shaft 29 where the same passes through the rear head 7 of the freezing chamber, and as so arranged the tubular shaft 30 constitutes an elongated auxiliary bearing for the rear end of said axially arranged shaft. The tubular shaft 30 has bearing near its forward end in the central bore of the rear head 7, and at its rear end in a box carried by a fork of the pedestal 3, as shown.

31 is a hub or circular enlargement arranged within the freezing chamber upon the forward end of said tubular shaft and provided with a circular rim 31' at its rear side adapted to fit the before described circular groove 9 of the rear head 7 to constitute a sealing gland and prevent a leakage of the contents of the freezing chamber along the exterior of said tubular shaft. At its other side said hub is formed with a circular groove 32, for the reception of an annular rim 33 carried by the inner shaft 29, aforesaid, and adapted to constitute a sealing gland and prevent leakage of the contents of the freezing chamber along the exterior of the shaft 29.

34 and 35 are radial arms carried by the hub 31 to form the rear end supports for the scraping and conveying blades hereinafter described.

36 are a pair of longitudinally extending scraper blades moving in contact with the inner circular surface of the freezing chamber and extending the length of the same. Such blades are supported at their rear ends by arms 37 pivoted to the outer ends of the radial arms 34, with the pivotal movement regulated and restricted by adjustable abutment screws 38, as shown in Fig. 6. At their forward ends said scraper blades are carried in an identical manner upon radial arms of a hub 39 turning upon the axial shaft 29 before described. The function of said blades is to continuously remove the frozen cream from the inner surface of the shell or casing of the freezing chamber as such cream becomes congealed thereon.

40 are a pair of conveyer blades also moving in contact with the circular interior of the freezing chamber to the rear of the scraper blades aforesaid, and extending the length of said freezing chamber in a plane oblique to the longitudinal axis of the same. Such conveyer blades are attached at their rear ends to the aforesaid radial arms 35, while at their forward end a similar attachment is had with radial arms 41 on the loosely turning hub 39 aforesaid. The function of such conveyer blades is to impart to that portion of the material adjacent to the circular wall of the freezing chamber a longitudinal movement in a direction toward the forward end of said freezing chamber, while the inner portion of the material is moved in the opposite direction by the series of conveyer blades hereinafter described, to jointly cause an endless longitudinal circulation of the material during the operation of the apparatus. Another function of the conveyer blades 40 is to cause a positive discharge of the material, on the completion of the freezing operation and an opening of the discharge gate 18 heretofore described.

42 are a series of inclined conveyer blades carried by the axial shaft 29 of the freezing chamber, and extending radially into adjacent relation to the conveyer blades 40, and pitches in a direction opposite to that of said blades 40, so as to effect the longitudinal movement of the central portion of the material in a direction opposite to that which is imparted to the outer portion of the material by the blades 40, aforesaid.

43 is a bevel gear carried by the tubular shaft 30; and 44 is a companion bevel gear carried by the axial shaft 29.

45 is an intermediate driving bevel gear meshing with and driving the gears 43 and 44 in reversed directions; such gear 45 is carried by a transversely arranged shaft upon which are also mounted pulleys 46 by which the apparatus is driven.

47 is a removable housing covering the gears 43, 44 and 45 to house the same and prevent injury therefrom to the operator or a person heedlessly approaching the same.

48 is the brine inlet neck arranged near the lowest part of the brine chamber aforesaid, and 49 is the brine outlet neck arranged near the corresponding highest part of said brine chamber.

With the apparatus of the described construction the arrangement of the freezing chamber in the inclined position before referred to forms a material part in providing practical merit in the apparatus, in that such position aids to a very material extent in the formation of a high grade ice-cream in the normal operation of the apparatus as follows:—The batch of ice-cream forming material initially placed in the open top receptacle 19, is introduced through the faucet 21, and inlet neck 16, into the freezing chamber, to occupy two-thirds, more or less, of the capacity of the same, leaving an unoccupied air filled and sealed space in the upper rear end of the freezing chamber into which the cream in its gradual passage into a frozen condition expands with an increase in volume of from thirty to sixty per cent., and to more or less fully occupy the entire capacity of the freezing chamber. During such freezing operation the material is exposed to a constant stirring action of the inner series of conveyer blades 42; at the same time the before described endless circulation of the cream longitudinally and in an inclined direction in the freezing chamber is effected by the combined action of the conveyer blades 40 and 42, with the result as found by practical experience that a very superior grade of ice-cream is produced.

Having thus fully described my said invention what I claim as new and desire to secure by Letters Patent, is:—

1. An ice-cream freezer, comprising a supporting base, a closed cylindrical casing constituting a freezing chamber and fixedly attached to said base in a position inclined from the horizon, a removable head closing the depressed end of said casing, inlet and outlet necks carried by said head, means for producing a cooling effect on the exterior of said casing, and means for imparting movement to the material within said casing, substantially as set forth.

2. An ice-cream freezer, comprising a supporting base, a closed cylindrical casing constituting a freezing chamber and fixedly attached to said base in a position inclined from the horizon, inlet and outlet necks at the depressed end of said casing, a removable head carrying said necks, means for producing a cooling effect on the exterior of said casing, and means for imparting movement to the material within said casing, substantially as set forth.

3. An ice-cream freezer, comprising a supporting base, a closed cylindrical casing constituting a freezing chamber and fixedly attached to said base in a position inclined from the horizon, inlet and outlet necks at the depressed end of said casing, means for producing a cooling effect on the exterior of said casing, and means for imparting movement to the material within said casing, the same comprising a longitudinal axial shaft in the casing, a series of conveyer blades on said shaft, a tubular shaft surrounding said axial shaft, a scraper blade and a conveyer blade operatively connected to said tubular shaft, and gearing for imparting reversed rotation to said shafts, substantially as set forth.

4. An ice cream freezer, comprising a supporting base, a closed cylindrical casing constituting a freezing chamber and fixedly attached to said base in a position inclined from the horizon, inlet and outlet necks at the depressed end of said casing, a removable head carrying said necks, means for producing a cooling effect on the exterior of said casing, and means for imparting movement to the material within the casing, the same comprising a longitudinal axial shaft in the casing, a series of conveyer blades on said shaft, a tubular shaft surrounding said axial shaft, a scraper blade and a conveyer blade operatively connected to said hollow shaft, and gearing for imparting reversed rotation to said shafts, substantially as set forth.

5. An ice-cream freezer, comprising a supporting base, a closed cylindrical casing constituting a freezing chamber and fixedly attached to said base in a position inclined from the horizon, inlet and outlet necks at the depressed end of said casing, means for producing a cooling effect on the exterior of said casing, and means for imparting movement to the material within said casing, the same comprising a longitudinal axial shaft in the casing, a series of conveyer blades on said shaft, a tubular shaft surrounding said axial shaft, a scraper blade and a conveyer blade operatively connected to said hollow shaft, a forked pedestal carried by the base and provided with bearings for said shafts, and gearing for imparting reversed rotation to said shafts, substantially as set forth.

6. An ice-cream freezer, comprising a supporting base, a closed cylindrical casing constituting a freezing chamber and fixedly attached to said base in a position inclined from the horizon, inlet and outlet necks at the depressed end of said casing, a removable head carrying said necks, means for producing a cooling effect on the exterior of said casing, and means for imparting movement to the material within the casing, the same comprising a longitudinal axial shaft in the casing, a series of conveyer blades on said shaft, a tubular shaft surrounding said axial shaft, a scraper blade and a conveyer blade operatively connected to said hollow shaft, a forked pedestal carried by the base and provided with bearings for said shafts, and gearing for imparting reversed rotation to said shafts, substantially as set forth.

7. An ice-cream freezer, comprising a supporting base, a closed cylindrical casing constituting a freezing chamber and fixedly attached to said base, inlet and outlet necks at one end of said casing, means for producing a cooling effect on the exterior of said casing, and means for imparting movement to the material within the casing, the same comprising a longitudinal axial shaft in the casing, a series of conveyer blades on said shaft, a tubular shaft surrounding said axial shaft, a scraper blade and a conveyer blade operatively connected to said hollow shaft, and gearing for imparting reversed rotation to said shafts, substantially as set forth.

8. An ice-cream freezer comprising a supporting base, a closed cylindrical casing constituting a freezing chamber and fixedly attached to said base, inlet and outlet necks at one end of said casing, a removable head carrying said necks means for producing a cooling effect on the exterior of said casing, and means for imparting movement to the material within the casing, the same comprising a longitudinal axial shaft in the casing, a series of conveyer blades on said shaft, a tubular shaft surrounding said axial shaft, a scraper blade and a conveyer blade operatively connected to said tubular shaft, and gearing for imparting reversed rotation to said shafts, substantially as set forth.

9. An ice-cream freezer, comprising a supporting base, a closed cylindrical casing constituting a freezing chamber and fixedly attached to said base, inlet and outlet necks at one end of said casing, means for producing a cooling effect on the exterior of said casing, and means for imparting movement to the material within the casing, the same comprising a longitudinal axial shaft in the casing, a series of conveyer blades on said shaft, a tubular shaft surrounding said axial shaft, a scraper blade and a conveyer blade operatively connected to said hollow shaft, a forked pedestal carried by the base and provided with bearings for said shafts, and gearing for imparting reversed rotation to said shafts, substantially as set forth.

10. An ice-cream freezer comprising a supporting base, a closed cylindrical casing constituting a freezing chamber and fixedly attached to said base, inlet and outlet necks at one end of said casing, a removable head carrying said necks, means for producing a cooling effect on the exterior of said casing, and means for imparting movement to the material within the casing the same comprising a longitudinal axial shaft in the casing, a series of conveyer blades on said shaft, a tubular shaft surrounding said axial shaft, a scraper blade and a conveyer blade operatively connected to said hollow shaft, a forked pedestal carried by the base and provided with bearings for said shafts, and gearing for imparting reverse rotation to said shafts, substantially as set forth.

11. In an ice-cream freezer of the type herein described, the combination of a casing having an end head in which is formed an axial bore and a groove concentric with said bore, a shaft passing through said bore and provided with a circular rim fitting said groove, and a conveyer blade operatively connected to said shaft, substantially as set forth.

12. In an ice-cream freezer of the type herein described, the combination of a casing having an end head in which is formed an axial bore and a groove concentric with said bore, a tubular shaft passing through said bore and provided with a circular rim fitting said groove and with a companion concentric groove, an axial shaft arranged in the bore of the tubular shaft and provided with a circular rim fitting the groove of the tubular shaft, and conveyer blades operatively connected to said shafts, substantially as set forth.

13. In an ice-cream freezer of the type herein described, the combination of a casing having an end head in which is formed an axial bore, a tubular shaft passing through said bore and provided with an enlarged inner end formed with a concentric groove, an axial shaft arranged in the bore of the tubular shaft and provided with a circular rim fitting the groove of the tubular shaft, and conveyer blades operatively connected to said shafts, substantially as set forth.

Signed at Chicago, Illinois, this 30th day of July 1907.

GEORGE F. DICKSON.

Witnesses:
ROBERT BURNS,
HENRY MOE.